Patented Dec. 8, 1936

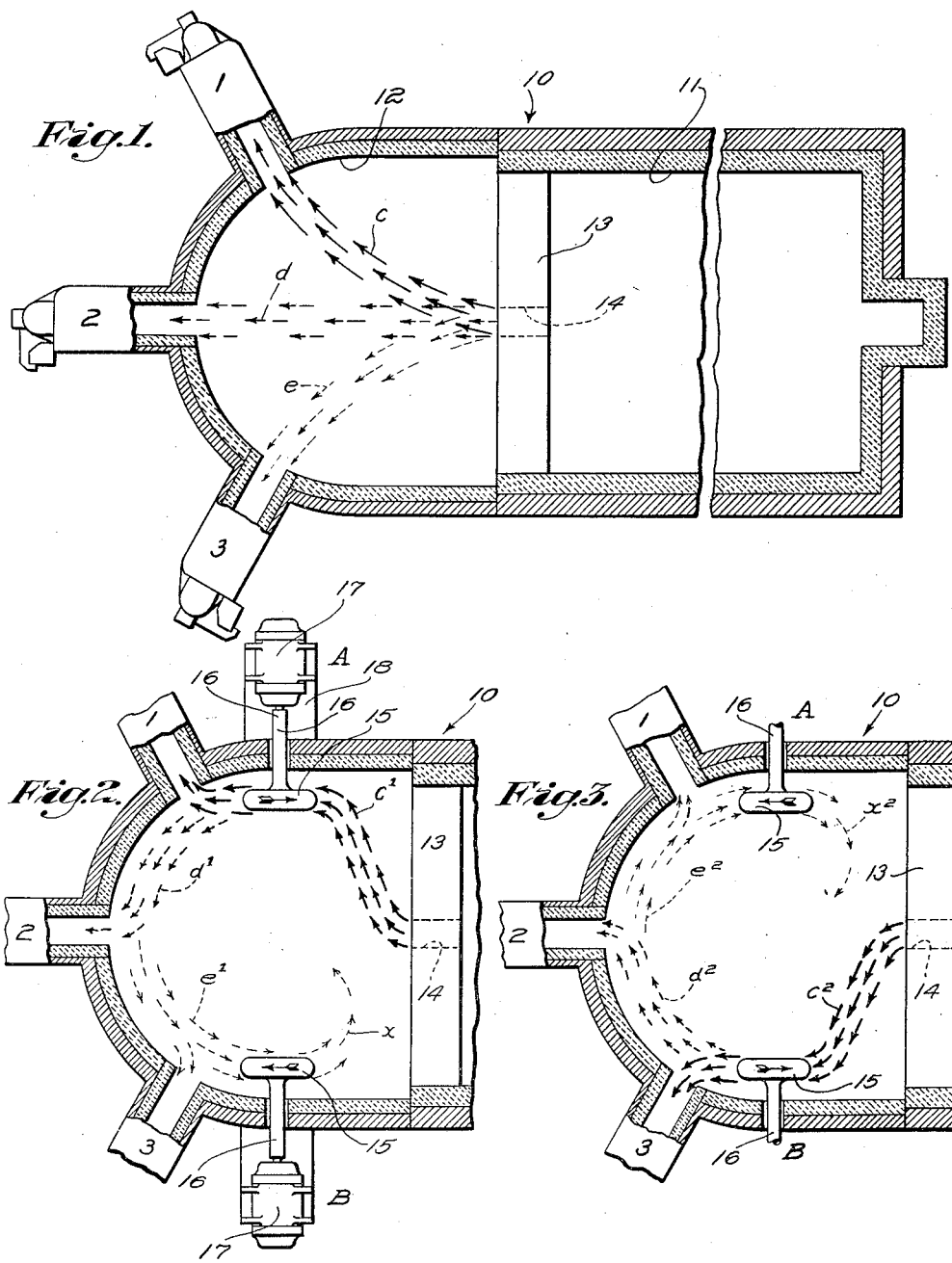

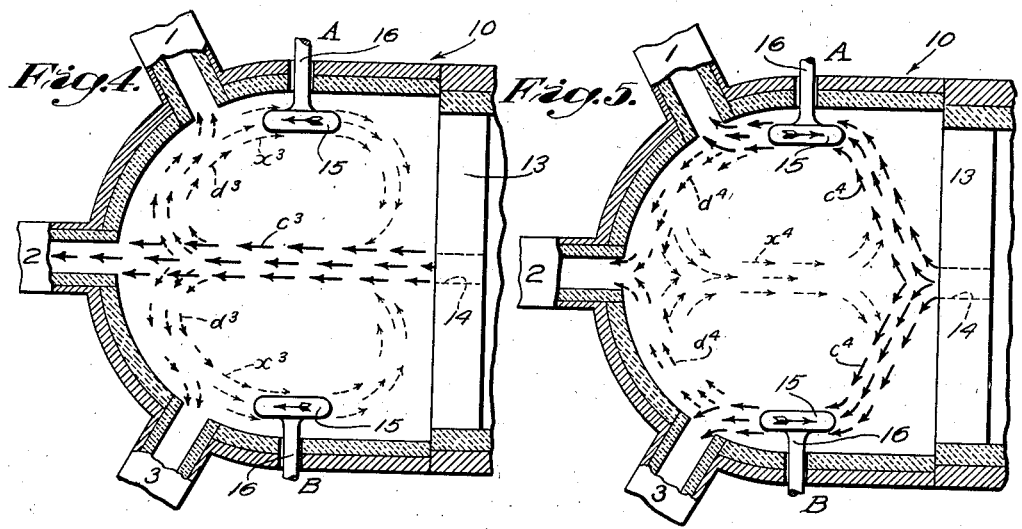
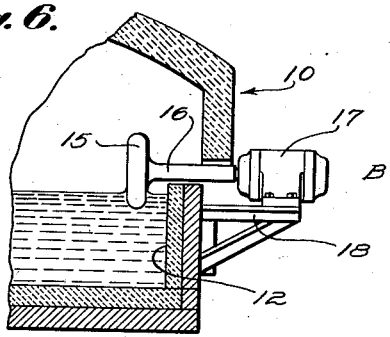
| Stirrer-A. | Ctr-Clockwise | Clockwise | Clockwise | Ctr-Clockwise |
|---|---|---|---|---|
| Stirrer-B. | Ctr-Clockwise | Clockwise | Ctr-Clockwise | Clockwise |
| Ware Feeder 1 | Light | Heavy | Heavy | Light |
| Ware Feeder 2 | Medium | Medium | Light | Heavy |
| Ware Feeder 3 | Heavy | Light | Heavy | Light |
| Figures | 2. | 3. | 4. | 5. |
Looking Towards Motor of Stirrer
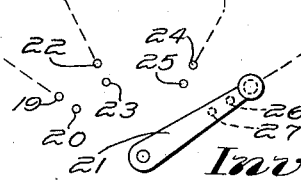

2,063,842

UNITED STATES PATENT OFFICE 2,063,842

SELECTIVE APPARATUS FOR AND METHOD OF CONTROLLING FLOW OF GLASS TO TANK OR FURNACE FOREHEARTHS

William T. Honiss, West Hartford, Conn., assignor to Hartford Empire Company, Hartford, Conn., a corporation of Delaware Application January 4, 1935, Serial No. 377

10 Claims. (Cl. 49—56)

This invention relates generally to glass melting tanks or furnaces provided with forehearths or extensions from which glass charges are obtained for fabrication into articles of glassware.

An object of the invention is to provide apparatus for and a method of producing in the refining or delivery end portion of a tank or furnace controlled circulatory movements of the glass of such character as to permit a selection within a considerable range of the temperature of the glass passing from said tank or furnace to a plurality of glass delivery forehearths independently of the pulls of the respective forehearths on the glass at any given time.

A further object of the invention is to provide a novel apparatus for and a novel method of circulating glass in the refining end or compartment of the tank or furnace, so as to supply glass to a glass delivering forehearth or forehearths of such tank or furnace without causing the formation of flow channels in the main body of glass in such portion of the tank or furnace.

Other objects and advantages of the invention will hereinafter be pointed out or will become apparent from the following description of the construction and typical modes of operation of a particular embodiment of the invention as applied to a glass melting tank or furnace having a plurality of forehearths or extensions as aforesaid, and as shown in the accompanying drawings, in which:

Figure 1 is a horizontal section through a typical glass melting tank or furnace having a plurality of spaced forehearths appurtenant to its refining or delivery end, the outer end portions of such forehearths being shown in plan, the view illustrating undesirable channeling and flow conditions which will be obviated by the use of the present invention;

Fig. 2 is a view generally similar to Fig. 1 but omitting the melting end portion of the tank or furnace and the outer end portions of the forehearths and showing structural elements of the present invention applied to the refining end or compartment of such tank or furnace, the view also showing one way of using such structural elements according to the present invention.

Fig. 3 is a view similar to Fig. 2 but showing the structural elements of the invention operated to meet service requirements different from those indicated by the showing of Fig. 2.

Figs. 4 and 5 are views similar to Figs. 2 and 3 but showing the structural elements of the invention operated to carry out the invention under still different service conditions;

Fig. 6 is a fragmentary transverse vertical section through one side of the refining compartment of the tank, showing one of the two glass circulating or stirring devices of the structure of each of the preceding views, and Fig. 7 is a combined chart and diagrammatic view, showing different service conditions that exist when the apparatus is used as illustrated in Figs. 2 to 5 inclusive, and particular operations of the structural elements of such apparatus in carrying on the invention to meet these service conditions, together with a controller for selecting the operations of the structural elements of the invention in accordance with different service conditions at different times.

In Fig. 1, the numeral 10 designates generally a glass melting tank or furnace having a melting chamber or compartment 11 and a refining chamber or compartment 12, separated from each other by a transverse wall or partition 13. A submerged throat or passage 14 maintains glass flow communication between the melting compartment 11 and the refining compartment 12.

A plurality of forehearths or extensions are spaced around the delivery end or nose of the refining compartment of the tank or furnace, the inlet ends of such forehearths preferably being located equi-distant from the throat 14. These forehearths are three in number in the particular structure shown in Fig. 1 and respectively are designated 1, 2, and 3.

Each of the forehearths may be provided at its outer end with glass feeding means of any suitable or preferred construction or may be of such character as to permit glass to be gathered or removed from the supply body of glass in the forehearth in any suitable known manner and by any suitable known means.

The structure which has been described so far is such as is in general use in the continuous melting, refining and delivery of glass in charges which are to be fabricated by glassware forming machinery into articles of glassware.

It is usual in the operation of such a structure to feed the glass-making materials or batch into the melting compartment 11 of the tank at the outer end thereof and to apply heat thereto to melt the glass-making materials rapidly. The glass produced by the fusion of the glass-making materials will pass through the throat 14 into the refining compartment 12 in which the temperature ordinarily is somewhat lower than that in the melting compartment or end of the tank. It of course will be understood that the operation is such as to provide a body of molten glass of substantial depth both in the melting compartment and in the refining compartment of the tank or furnace.

The forehearths or extensions are usually in open communication at their inner ends with the refining compartment of the tank or furnace below the level of glass in the latter, so that glass will flow continuously into each forehearth to replace the glass that has been fed or otherwise removed therefrom. Consequently, the pull that each forehearth exerts on the glass in the refining compartment of the tank will depend on the output of glass from that forehearth. Thus, if one of the forehearths is employed to feed glass in relatively large and heavy charges, as for the production of relatively large or so-called heavy ware, that forehearth will exert a greater pull on the glass in the refining compartment of the tank than other forehearths from which glass is being fed in charges of smaller size for the production of lighter ware.

The relatively heavy pull from a forehearth that is being used for the production of heavy ware will tend to pull a relatively hot stream of glass from the throat 14 through the refining compartment in a substantially straight line toward that forehearth, as for example in the direction indicated by the heavy solid arrows c, in Fig. 1. The forehearths employed in the production of charges for lighter ware, as the forehearths 2 and 3, will pull streams of cooler and more slowly moving glass from the refining compartment into such forehearths. In Fig. 1, the streams of glass passing to the forehearths 2 and 3 are indicated by the broken line arrows d and e, respectively, the arrows d being heavier than the arrows e to indicate that the stream of glass passing more directly to the forehearth 2 probably will be somewhat hotter than the stream of glass passing to the forehearth 3.

The results of the differential pulls by respective forehearths on the glass in the refining compartment are undesirable both because they produce or promote channeling in the body of glass in the refining compartment and because the temperatures of the respective streams of glass passing to the several forehearths are improperly differentiated from one another. The temperature of the glass entering the forehearth that is used in the production of heavy charges for heavy ware is higher than that of the glass passing to each of the remaining forehearths, whereas the reverse should be true.

In practice, this undesirable temperature differential must be corrected in the forehearths and this ordinarily means that a forehearth that is to be used at any time for the production of relatively heavy ware must be sufficiently long to permit the required cooling of the glass therein and usually some reheating thereof before such glass reaches the feed outlet or place of removal of glass from the forehearth. When such a forehearth is used for the production of lighter charges, the problem then is to maintain the glass entering the forehearth at the higher temperature desired, or to heat it up to that temperature by the time it reaches the glass feed or delivery point. This in turn requires use of an excessive amount of fuel and may involve various difficulties.

To obviate the difficulties and objectionable features above pointed out, the present invention contemplates the provision of glass stirring or circulating devices, respectively designated A and B, Figs. 2 to 5 inclusive, at opposite sides of the refining compartment of the tank and between the throat 14 and the inlet ends of the adjacent forehearths. Each of these glass stirring or circulating devices may comprise a rotary impeller 15 having a portion of its surface immersed in the glass in the refining compartment. Such rotary impeller may have a horizontal stem or shaft 16 extending through a suitable opening in the wall of the tank and operatively connected with a reversible motor 17. The motor 17 may be supported on a suitable bracket 18, attached to the frame structure of the tank, or may be supported in any other suitable known manner. The axis of rotation of each impeller preferably is at right angles with the direction of length of the refining compartment of the tank.

When the two glass stirring or circulating devices are disposed directly opposite each other and each of the impellers is rotating in a counterclockwise direction, as viewed by one looking inward from its outer end, as shown in Fig. 2 and as indicated by the data in the column above Fig. 2 in the charge of Fig. 7, a circulatory movement of glass in the refining compartment will be produced as indicated by the arrows in Fig. 2.

This mode of operation is adapted and intended for use when the forehearth 1 is producing charges for light ware, the forehearth 2 is producing charges for ware of medium size, and the forehearth 3 is producing charges for heavy ware. The impeller of the device A induces movement of glass from the portion of the refining compartment adjacent to the throat 14 laterally to such impeller and thence toward the inlet end of the forehearth 1, as indicated by the heavy solid arrows c'. The glass entering the forehearth 1, therefore, will be at a relatively high temperature.

The circulatory movement of glass at the opposite side of the refining compartment is toward the wall 13 by reason of the rotation of the impeller 15 of the device B. Thus, glass will move past the inlet of the forehearth 1, as indicated by the heavier of the broken line arrows d' generally toward the inlet of the forehearth 2. The glass entering the forehearth 2, which is used to feed glass for the production of medium ware, will be cooler than the glass entering the forehearth 1.

There will be a continued circulatory movement of glass past the forehearth 2 and toward the forehearth 3, as indicated by the lighter broken line arrows e', which will assure the passage into the forehearth 3 of glass that is cooler than the glass supplied to the forehearth 2. In other words, the glass supplied to the forehearth that is used in feeding glass for production of heavy charges will be cooler than the glass supplied to the other forehearths, as is desirable.

The circulatory movement of glass past the inlet of the forehearth 3 will be rearwardly and laterally toward the currents C' and then outwardly, as indicated by the arrows x. Thus, there will be continuous circulatory movement and homogenization of the glass in the refining chamber and this will preclude undesirable stratification or stagnation and cooling of any portion of such glass, in addition to supplying to the several forehearths glass of more appropriate temperatures than heretofore.

When the conditions shown in Fig. 3 and as outlined in the column over Fig. 3 of the chart 7 exist, hotter glass will move as indicated by the arrows $c^2$ toward the inlet end of the forehearth 3. Thence cooler glass will move as indicated by the arrows $d^2$ in the direction of the inlet end of the forehearth 2. Still cooler glass will move as indicated by the arrows $e^2$, toward the inlet of the forehearth 1. The movement of the glass past the forehearth 1 will be rearwardly beneath the impeller 15 of the device A and then rearwardly and laterally and finally outwardly, as indicated by the arrows $x^2$ in Fig. 3. This mode of operation is adapted for use when the forehearth 3 is used for the production of charges for light ware, the forehearth 2 is producing charges for medium ware, and the forehearth 1 is employed for the production of charges for heavy ware.

When service conditions are as shown in the column above Fig. 4 in Fig. 7 and in Fig. 4, the impeller of the stirrer A will be rotated in a clockwise direction and the impeller of the stirrer B will be rotated in a counterclockwise direction. Relatively hot glass then will pass in the direction indicated by the heavy solid arrows $c^3$ to the forehearth 2, and cooler portions of glass will be diverted in opposite directions along the inner wall of the nose of the refining compartment of the tank, as indicated by the arrows $d^3$ toward both the forehearth 1 and the forehearth 3, after which the movement of the currents in the glass in the refining compartment will be beneath both rotary impellers and then laterally toward the currents $c^3$, as indicated by the arrows $x^3$. This operation is suitable for the conditions that exist when the forehearth 2 is being used to feed glass for the production of light ware, while the forehearths 1 and 3 are both used for the production of charges for heavy ware.

In Fig. 5, the impeller of the device A is being rotated counterclockwise while the impeller of the device B is rotated in a clockwise direction. This mode of operation is suitable for use when the forehearths 1 and 3 are both employed to feed charges for the production of light ware, and the forehearth 2 is employed to feed charges for the production of heavy ware. Divergent currents, indicated by the heavy arrows $c^4$, will pass from the throat 14 laterally toward and beneath the impellers 15 of the devices A and B toward the inlet ends of the forehearths 1 and 3, after which cooler glass will move as indicated by the arrows $d^4$ past both forehearths 1 and 3 toward the forehearth 2. The direction of the currents of glass in the refining compartment then will be rearwardly toward the diverging currents $c^4$, as indicated by the arrows $x^4$.

Any suitable known mechanism may be used to predetermine the direction of rotation of the impeller of each of the devices A and B independently of the other, and to reverse the direction of rotation of each impeller at will. In Fig. 7 a diagrammatic representation of a controller is shown. A set of contacts 19 and 20 is shown as connected by a dot-and-dash line with Fig. 2, such line representing any suitable wiring arrangement for causing the impellers of both devices A and B to be rotated counterclockwise when a pivoted controller arm 21 has been swung to position to engage both the contacts 19 and 20.

Contacts 22 and 23, when engaged by the controller arm 21, will operate the motors of the devices A and B to turn the impellers of such devices clockwise.

Contacts 24 and 25, when engaged by the controller arm 21, will drive the motors of the devices A and B so as to turn the impeller of the device A clockwise and the impeller of the device B counterclockwise. The contacts 26 and 27, shown in Fig. 7 as engaged by the controller arm 21, cause operation of the motors of the devices A and B so as to drive the impeller of device A counterclockwise and the impeller of the device B clockwise.

The present invention enlarges the range of utility of a forehearth of average or relatively short length by permitting the use of such a forehearth to feed glass either in large charges for heavy ware or small charges for light ware. The invention obviates the necessity of a relatively long cooling section for the required cooling of the glass in a forehearth from which charges suitable for fabrication into heavy ware are to be fed.

In lieu of rotary impellers, any other suitable glass stirring or circulating mechanism of known construction and mode of operation may be employed. Details of structure and steps of methods for carrying out the invention may be varied without departing from the spirit and scope thereof as such invention is not to be limited beyond the terms of the appended claims.

I claim:

1. The combination with a glass melting tank or furnace having a plurality of glass receiving forehearths at the delivery end thereof, of mechanism for causing circulatory movement of glass in the delivery end portion of said tank or furnace in such a way as to supply said forehearths in a predetermined variable order with thermally different portions of the glass thus caused to circulate.

2. The combination with a glass tank or furnace having a refining compartment provided with a plurality of forehearths into which glass may flow from said refining compartment, of means for stirring glass in said refining compartment to cause currents therein extending to and past said forehearths in a predetermined order to supply said forehearths with glass of temperatures differing from the respective forehearths in accordance with differences between the temperatures desired at places of removal of glass from the respective forehearths.

3. The combination with a glass melting tank or furnace having adjacent melting and refining compartments connected by a passage of restricted cross sectional area through which relatively hot glass may pass from the melting compartment to the refining compartment, of a plurality of forehearths connected with the tank at the outer end of said refining compartment and each adapted to receive a stream of glass from said refining compartment, and means engaging with the glass in said refining compartment for controlling the direction of the currents therein so as to establish more direct flow of hotter glass from the melting compartment through the refining compartment to one or more of said forehearths in which hotter glass is desired than to the remaining forehearth or forehearths.

4. The combination with a glass melting tank or furnace having adjacent melting and refining compartments connected by a relatively narrow flow passage through which relatively hot glass passes from the melting compartment into the refining compartment, of a plurality of glass delivering forehearths spaced around the outer end of said refining compartment and each adapted to receive glass from said refining compartment and to exert a pull on the glass in the latter that will vary with the output of glass from said forehearth, and stirring mechanism engaging with glass in the refining compartment of said tank or furnace for causing movement of glass entering said refining compartment to and past said forehearths for supplying said forehearths with glass of temperatures differing for the respective forehearths in accordance with differences between the temperatures of the glass at the delivery points of the respective forehearths and independently of differences between the outputs of said forehearths.

5. The combination with a glass melting tank or furnace having adjacent melting and refining compartments connected by a narrow passage through which relatively hot glass flows from said melting compartment into said refining compartment, of a plurality of forehearths at the outer end of said refining compartment and each adapted to receive glass from said refining compartment, a pair of glass circulating devices engaging with the glass at opposite sides of said refining compartment, said glass circulating devices being operable to circulate the glass entering said refining compartment along any one of a plurality of different paths in said refining compartment so as to select the order in which said forehearths will be supplied with portions of the glass thus circulated.

6. The method of controlling the delivery of molten glass from a refining compartment of a glass melting tank or furnace to a plurality of glass delivering forehearths at the outer end of said refining compartment, which comprises causing circulatory movement of the glass in the refining compartment in a path that extends to and past the respective forehearths in an order that is selected according to the relative temperatures desired for the glass to be delivered by said forehearths, said path of circulatory movement being such as to supply relatively hot glass to each forehearth from which relatively hot glass is to be delivered and cooler glass to the remaining forehearth or forehearths.

7. The method of controlling the flow of molten glass from a refining compartment of a melting tank or furnace to a plurality of forehearths at the outer end of said refining compartment, which comprises stirring the glass in said refining compartment at a point nearer to the glass receiving end of said refining compartment than any of said forehearths so as to cause in the glass in said refining compartment currents extending from the receiving end of said refining compartment first to a forehearth in which hotter glass is desired and then to the remaining forehearth or remaining forehearths in order according to a descending scale of temperatures desired for the glass in such forehearths.

8. The method of controlling flow of glass from a refining compartment of a glass melting tank or furnace to a plurality of forehearths at the outer end of said refining compartment, which comprises circulating glass in the refining compartment in a path that extends from the glass receiving end of said refining compartment to and past said forehearths in an order that is predetermined in accordance with the relative temperatures desired for the glass entering said forehearths and independently of differentials between the pulls exerted by the respective forehearths on the glass in said refining compartment.

9. The method of controlling flow of glass from a refining compartment of a glass melting tank or furnace to a plurality of forehearths at the outer end of said refining compartment which comprises, imparting circulatory movement to the glass at places adjacent to opposite sides of the refining compartment and nearer to the glass receiving end of said refining compartment than any of said forehearths, and altering the direction of such circulatory movement imparted to the glass at either or both of said places to vary the path of circulatory movement of glass in said refining compartment with relation to the several forehearths.

10. In the operation of a glass melting tank or furnace having adjacent melting and refining compartments connected by a relatively narrow submerged throat and having a plurality of spaced forehearths at the outer end of the refining compartment to which glass may flow from said refining compartment, the method of controlling the flow of glass from said refining compartment to said forehearths which comprises causing circulatory movement of glass in the refining compartment by operating stirrers in contact with portions of the glass adjacent to opposite sides of the refining compartment and between said throat and the adjacent forehearths, and predetermining the direction of said circulatory movement of glass from said stirrers to the respective forehearths by selecting the operation of said stirrers as required to supply relatively hot and cooler glass to said forehearths in a predetermined order independently of differences between the pulls exerted on the glass in said refining compartment by the several forehearths.

WILLIAM T. HONISS.